US011860407B2

(12) United States Patent
Mukasa et al.

(10) Patent No.: US 11,860,407 B2
(45) Date of Patent: Jan. 2, 2024

(54) OPTICAL FIBER

(71) Applicant: FURUKAWA ELECTRIC CO., LTD., Tokyo (JP)

(72) Inventors: Kazunori Mukasa, Tokyo (JP); Tamas Mihalffy, Budapest (HU); Zoltan Varallyay, Budapest (HU)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 17/456,601

(22) Filed: Nov. 26, 2021

(65) Prior Publication Data

US 2022/0082753 A1    Mar. 17, 2022

Related U.S. Application Data

(63) Continuation of application No. PCT/JP2020/020423, filed on May 22, 2020.

(30) Foreign Application Priority Data

May 27, 2019  (JP) .................................. 2019-098406

(51) Int. Cl.
*G02B 6/02*     (2006.01)
*G02B 6/036*    (2006.01)

(52) U.S. Cl.
CPC ..... *G02B 6/02395* (2013.01); *G02B 6/02004* (2013.01); *G02B 6/0365* (2013.01); *G02B 6/03627* (2013.01)

(58) Field of Classification Search
CPC ............ G02B 6/02004; G02B 6/02395; G02B 6/03627; G02B 6/0365
See application file for complete search history.

(56) References Cited

U.S. PATENT DOCUMENTS 7,295,741 B2    11/2007 Sako et al.
8,200,057 B2 *   6/2012 Han ..................... G02B 6/0283
                                                     385/127

(Continued)

FOREIGN PATENT DOCUMENTS

EP    3 098 631 A1    11/2016
JP    05-019144 A      1/1993

(Continued)

OTHER PUBLICATIONS

International Search Report dated Jul. 14, 2020 in PCT/JP2020/020423 filed on May 22, 2020, citing documents AA & AN-AQ therein, 2 pages.

(Continued)

*Primary Examiner* — Ryan A Lepisto
(74) *Attorney, Agent, or Firm* — Oblon, McClelland, Maier & Neustadt, L.L.P.

(57) ABSTRACT

An optical fiber includes: a core made of silica-based glass; a cladding configured to cover an outer circumference of the core and made of silica-based glass having a refractive index smaller than a maximum refractive index of the core; and a coating configured to cover an outer circumference of the cladding. The cladding has an outer diameter of 120 μm or smaller, a mode field diameter at a wavelength of 1310 nm is 8.6 μm to 9.2 μm, an effective cut-off wavelength is 1260 μm or smaller, and a bending loss at a wavelength of 1550 nm in a case of bending at a diameter of 20 mm is 0.75 dB/turn or smaller.

25 Claims, 4 Drawing Sheets

(56) References Cited

U.S. PATENT DOCUMENTS

| | | |
|---|---|---|
| 8,837,891 B2 | 9/2014 | Oyamada |
| 9,057,817 B2 | 6/2015 | Bookbinder et al. |
| 9,746,605 B2 | 8/2017 | Sohma et al. |
| 9,964,697 B2 * | 5/2018 | Maruyama .............. G02B 6/125 |
| 2011/0058780 A1 | 3/2011 | Han et al. |
| 2017/0285257 A1 | 10/2017 | Maruyama et al. |
| 2018/0120503 A1 * | 5/2018 | Bennett .............. G02B 6/02266 |

FOREIGN PATENT DOCUMENTS

| | | |
|---|---|---|
| JP | 2007-033466 A | 2/2007 |
| JP | 2010-181641 A | 8/2010 |
| JP | 2013-242545 A | 12/2013 |
| JP | 2014-010412 A | 1/2014 |
| JP | 2015-219271 A | 12/2015 |
| JP | 2016-522428 A | 7/2016 |
| WO | WO 2016/190297 A1 | 12/2016 |

OTHER PUBLICATIONS

Murase et al., "Development of Small Diameter Optical Fiber", Showa Cable Review, vol. 53, No. 1, 2003, 13 pages (with English Machine Translation).
Extended European Search Report in corresponding European Patent Application No. 20815268.6, dated May 3, 2023, citing ref. 1; 9 pages.

* cited by examiner

OPTICAL FIBER

This application is a continuation of PCT international application Ser. No. PCT/JP2020/020423, filed on May 22, 2020 which designates the United States, incorporated herein by reference, and which claims the benefit of priority from Japanese Patent Applications No. 2019-098406, filed on May 27, 2019, incorporated herein by reference.

BACKGROUND

The present disclosure relates to an optical fiber.

In the fields of data communications and telecommunications, optical fibers with small diameters are attracting attentions as optical fibers that realize dense optical fiber cables. An optical fiber with a small diameter is in general an optical fiber in which a portion made of glass has a small diameter and the cladding diameter is small. Note that optical fibers with small diameters also include one whose outer circumference with a coating, formed such that the coating covers the outer circumference of a cladding, included is small because the cladding diameter is small.

As an optical fiber with a small diameter, a configuration in which a relative refractive-index difference of a core with respect to a cladding is high has been disclosed (Murase et. al., "Development of Cladding Fiber with Small Diameter", Review by SWCC SHOWA HOLDINGS CO., LTD., vol. 53, No. 1 (2003), pp. 32-36). The relative refractive-index difference of the optical fiber according to Murase et. al. is high and thus the properties do not accord with the standard of standard single mode optical fibers that is defined by ITU-T (International Telecommunication Union) G.652 (the G.652 standard below). As an optical fiber with a small diameter, a configuration in which a trench layer with a relative refractive-index difference of −0.08% or larger is formed has been disclosed (WO2016/190297). The optical fiber according to WO2016/190297 accords with the G.652 standard and has a cladding diameter (fiber diameter) approximately between 100 μm and 125 μm. As an optical fiber with a small diameter, a configuration including a primary coating layer and a secondary coating layer as a coating and the secondary coating layer is at 25 μm or smaller has been disclosed (Japanese Unexamined Patent Application Publication No. H5-19144). The optical fiber according to Japanese Unexamined Patent Application Publication No. H5-19144 has a fiber diameter of 125 μm and a small diameter is realized by reducing a coating thickness.

Japanese Unexamined Patent Application Publication No. 2015-219271 discloses a configuration in which a micro bending loss is reduced in an optical fiber in which an effective core area (Aeff) is relatively large at 130 μm² or larger. In the optical fiber according to Japanese Unexamined Patent Application Publication No. 2015-219271, the outer diameter of a primary coating layer is between 185 μm and 220 μm inclusive and the outer diameter of a secondary coating layer is between 225 μm and 260 μm inclusive.

Japanese Unexamined Patent Application Publication No. 2010-181641 and Japanese Unexamined Patent Application Publication No. 2013-242545 disclose a configuration of a trench-type optical fiber for which a bending property is taken into consideration.

SUMMARY

An optical fiber that accords with the single-mode optical fiber standard defined by ITU-T G.657 (the G.657 standard below) with a more strict bending property requirement than that of the G.652 standard and that has a small dimeter has not been disclosed.

There is a need for an optical fiber with a small diameter and a preferable bending property.

According to one aspect of the present disclosure, there is provided an optical fiber including: a core made of silica-based glass; a cladding configured to cover an outer circumference of the core and made of silica-based glass having a refractive index smaller than a maximum refractive index of the core; and a coating configured to cover an outer circumference of the cladding, wherein the cladding has an outer diameter of 120 μm or smaller, a mode field diameter at a wavelength of 1310 nm is 8.6 μm to 9.2 μm, an effective cut-off wavelength is 1260 μm or smaller, and a bending loss at a wavelength of 1550 nm in a case of bending at a diameter of 20 mm is 0.75 dB/turn or smaller.

DETAILED DESCRIPTION

An embodiment will be described below with reference to the drawings. Note that the embodiment to be described below does not limit the disclosure. In each drawing, the same or corresponding components are denoted with the same reference numerals as appropriate. A cut-off wavelength or an effective cut-off wavelength herein refers to the cable cut-off wavelength that is defined by ITU-T G.650.1. Terms that are not particularly defined herein accord with definitions and measuring methods according to G.650.1 and G650.2.

Figure 1:
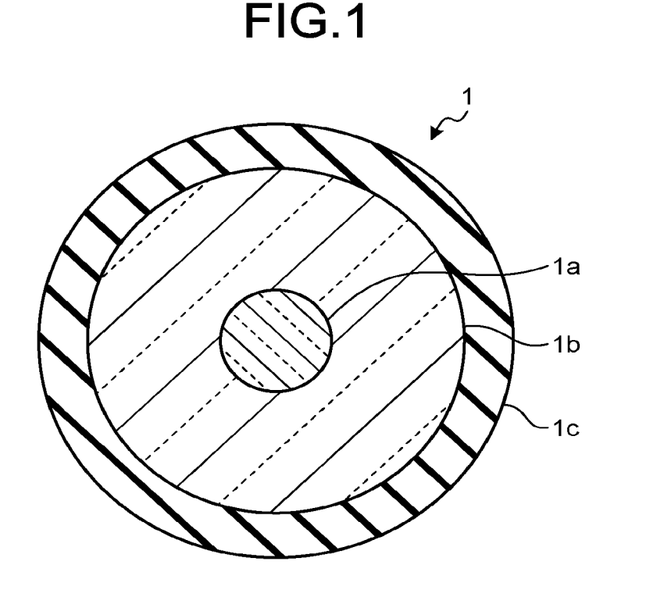
FIG. 1 is a schematic cross-sectional view of an optical fiber according to an embodiment.

FIG. 1 is a schematic cross-sectional view of an optical fiber according to an embodiment. An optical fiber 1 includes a core 1a that is positioned approximately at the center, a cladding 1b that covers the outer circumference of the core 1a, and a coating 1c that covers the outer circumference of the cladding 1b.

The core 1a and the cladding 1b are both made of silica-based glass. For example, the core 1a is made of quartz glass doped with a dopant for adjusting the refractive index, such as germanium (Ge) or fluorine (F). The cladding 1b has a refractive index lower than the maximum refractive index of the core 1a. The cladding 1b is, for example, made of pure quartz glass containing no dopant for adjusting the refractive index.

The outer diameter of the cladding 1b (cladding diameter) is 120 μm or smaller and is preferably smaller than 100 μm, that is, smaller than approximately 125 µm that is a cladding diameter of a single mode optical fiber that accords with the G.652 standard. The cladding diameter is preferably 85 µm or smaller in view of reduction in diameter and is more preferably 82 µm or smaller. The single-mode optical fiber that accords with the G.652 standard may be referred to as a standard SMF below as a standard optical fiber. Such a standard SMF generally includes a resin coating with a thickness of approximately 62.5 µm around the outer circumference of the cladding. The resin coating includes, for example, in the case of a double-layer structure, a primary coating layer with a thickness of approximately 37.5 µm and a secondary coating layer that is positioned on the side of the outer circumference of the primary coating layer and that has a thickness of approximately 25 µm. Thus, the outer diameter of the resin coating is approximately 250 µm.

Figure 2A:
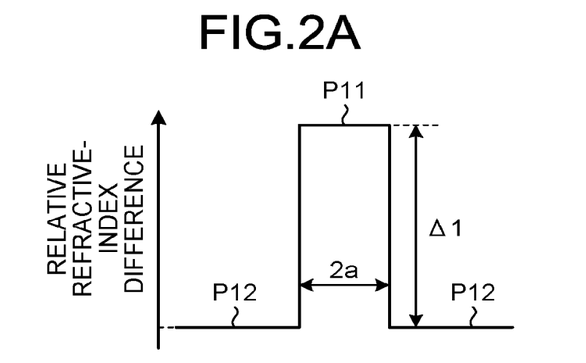
FIG. 2A is a schematic diagram of a step-type refractive index profile that is usable in the optical fiber according to the embodiment.
Figure 2B:
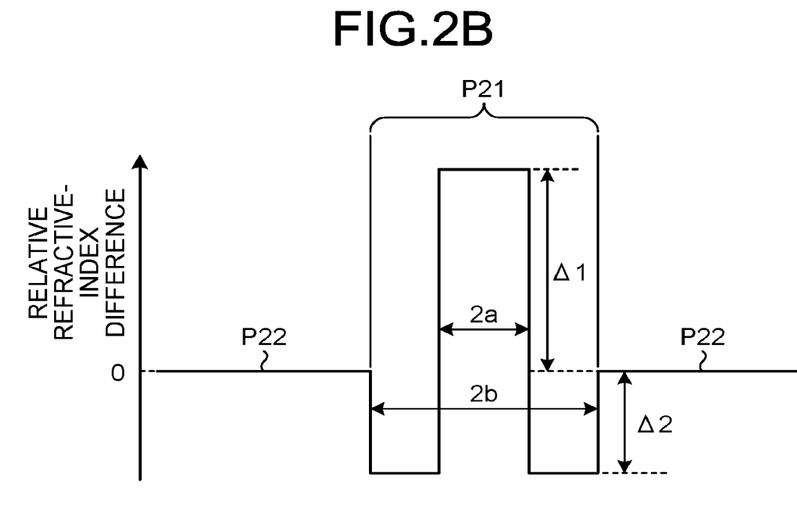
FIG. 2B is a schematic diagram of a W-type refractive index profile that is usable in the optical fiber according to the embodiment.
Figure 2C:
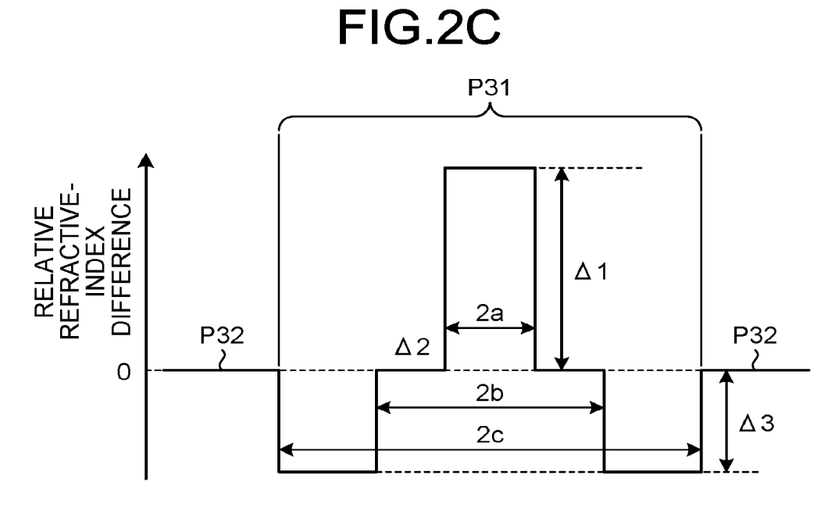
FIG. 2C is a schematic diagram of a trench-type refractive index profile that is usable in the optical fiber according to the embodiment.

The optical fiber 1 has, for example, a refractive index profile like that illustrated in FIG. 2A, 2B or 2C. FIGS. 2A, 2B and 2C all illustrate refractive index profiles of the core 1a of the optical fiber 1 in a radial direction from the center axis.

FIG. 2A illustrates a step-type refractive index profile. In FIG. 2A, a profile P11 represents a refractive index profile of the core 1a and a profile P12 represents a refractive index profile of the cladding 1b. The refractive index profile is presented by a relative refractive-index difference with respect to the cladding 1b. In the step-type refractive index profile, the diameter of the core 1a (core diameter) is 2a and the relative refractive-index difference of the core 1a with respect to the cladding 1b is Δ1. Δ1 is, for example, preferably between 0.3% and 0.5% inclusive and more preferably between 0.33% and 0.40% inclusive.

FIG. 2B illustrates what is referred to as a W-type refractive index profile. In FIG. 2B, a profile P21 represents a refractive index profile of the core 1a and a profile P22 represents a refractive index profile of the cladding 1b. In the W-type refractive index profile, the core 1a consists of a center core with an inner diameter being 2a and a depressed layer that is formed such that the depressed layer surrounds the outer circumference of the center core and that has a refractive index smaller than that of the cladding, an inner diameter that is 2a, and an outer diameter that is 2b. The relative refractive-index difference of the center core with respect to the cladding 1b is Δ1. The relative refractive-index difference of the depressed layer with respect to the cladding 1b is Δ2. Δ1 is, for example, preferably between 0.3% and 0.5% inclusive. Δ2 is, for example, preferably between −0.20% and −0.01% inclusive. b/a is, for example, between 1.5 and 6 inclusive.

FIG. 2C illustrates what is referred to as a trench-type refractive index profile. In FIG. 2C, a profile P31 represents a refractive index profile of the core 1a and a profile P32 represents a refractive index profile of the cladding 1b. In the trench-type refractive index profile, the core 1a consists of a center core with an inner diameter that is 2a; an intermediate layer that is formed such that the intermediate layer surrounds the outer circumference of the center core and that has a refractive index smaller than that of the core, an inner diameter that is 2a, and an outer diameter that is 2b; and a trench layer that is formed such that the trench layer surrounds the outer circumference of the intermediate layer and that has a refractive index smaller than that of the cladding, an inner diameter that is 2b, and an outer diameter that is 2c. The relative refractive index difference of the center core with respect to the intermediate layer is Δ1. The relative refractive index difference of the intermediate layer with respect to the cladding 1b is Δ2. Note that Δ2 is generally set at or around 0%. The relative refractive index difference of the trench layer with respect to the cladding 1b is Δ3.

Δ1 is, for example, preferably between 0.3% and 0.5% inclusive and more preferably between 0.33% and 0.40% inclusive. Δ3 is, for example, preferably between −0.26% and −0.10% inclusive. For example, b/a is between 1.8 and 3.6 inclusive and c/a is preferably between 3.4 and 5.2 inclusive.

Back to FIG. 1, the coating 1c is made of, for example, resin and has a function of protecting a glass portion of the optical fiber 1. The coating 1c is made of, for example, UV curing resin, or the like, and has a layered structure of a single layer or two or more layers. When the coating 1c is a double-layer structure, the coating 1c consists of a primary coating layer that is positioned on the side of the cladding and a secondary coating layer that is positioned on the side of the outer circumference of the primary coating layer. As the UV curing resin that is used for the coating 1c, for example, there are urethane acrylate based, polybutadiene acrylate based, epoxy acrylate based, silicone acrylate based, and polyester acrylate based resins, and the resin is not particularly limited as long as the resin is one used for a coating of the optical fiber.

In the case where the coating 1c is a single-layer structure, the Young's modulus is approximately 10 to 800 MPa and is, in the embodiment, 200 MPa. On the other hand, in the case where the coating 1c is a double-layer structure, the Young's modulus of the primary coating layer is approximately 0.2 to 1.5 MPa and is, in the embodiment, 0.5 Mpa. The Young's modulus of the secondary coating layer is approximately 500 to 2000 MPa and is, in the embodiment, 1000 Mpa.

The outer diameter of the optical fiber 1 including the coating 1c is, for example, 210 µm or smaller. When the coating 1c is a double-layer structure, the thickness of the primary coating layer is, for example, 20 µm or larger.

The optical fiber 1 according to the embodiment has properties in that the mode field diameter (MFD) at a wavelength of 1310 nm is between 8.6 µm and 9.2 µm inclusive, the effective cut-off wavelength (λcc) is 1260 nm or smaller, and the bending loss at a wavelength of 1550 nm in the case of bending at a diameter of 20 mm (referred to as macro bending loss below as appropriate) is 0.75 dB/turn or lower. The optical fiber 1 is thus an optical fiber that accords with the G.657Δ1 standard that is one of the G.657 standards with regard to the MFD, λcc, and macro bending loss and has a preferable bending property.

The optical fiber 1 preferably meets properties in that the zero-dispersion wavelength is between 1300 nm and 1324 nm inclusive and the dispersion slope at the zero-dispersion wavelength is 0.092 ps/nm$^2$/km or smaller and more preferably meets properties in that the dispersion slope is 0.073 ps/nm$^2$/km or larger.

Furthermore, the optical fiber 1 has a cladding diameter of 120 µm or smaller that is smaller than approximately 125 µm that is the cladding diameter of the standard SMF. As a result, the optical fiber 1 has a smaller diameter and has a preferable bending property. Thus, the optical fiber 1 is suitable to realize a dense optical fiber cable.

When the properties in that the macro bending loss is 0.10 dB/turn or smaller is met, the optical fiber is one that accords with the G.657Δ2 standard that is one of the G657 standards and that is with a more strict bending property requirement than that of the G.657Δ1 standard and that has a more preferable bending property.

In order to realize the above-described effective cut-off, it is preferable that the core 1a be set such that the effective cut-off wavelength is 1260 nm or smaller and it is particularly preferable that the diameter 2a be set such that the effective cut-off wavelength is 1260 nm or smaller. It is preferable that the core 1a, particularly, the diameter 2a be set such that the effective cut-off wavelength is 1000 nm or larger because the macro bending loss may be reduced.

When the outer diameter of the optical fiber 1 including the coating 1c is 210 μm or smaller, the outer diameter may be smaller than approximately 250 μm that is the outer diameter of the standard SMF including the resin coating.

In an optical fiber, reducing the outer diameter of a portion made of glass increases the micro bending loss (also referred to as lateral pressure loss). In general, a transmission loss of optical fibers in a form of an optical fiber cable increases. The amount of increase in transmission loss has a close relationship with the micro bending loss and the amount of increase is large when the micro bending loss is large.

In the optical fiber 1 according to the embodiment, a micro bending loss that is 20 times as large as the micro bending loss of the standard SMF at the wavelength of 1550 nm or smaller may be a practical micro bending loss. When it is defined that a value obtained by standardizing the micro bending loss by the micro bending loss in the standard SMF is a standardized micro bending loss, the standardized micro bending loss of the optical fiber 1 according to the embodiment is preferably 20 or smaller and furthermore is preferably 10 or smaller. In order to reduce the micro bending loss, in the case where the coating 1c is a double layer structure, it is preferable that the thickness of the primary coating layer be 20 μm or larger.

Note that, for the micro bending loss, a value that is measured by a fixed diameter drum method (one of abrasive paper methods) that is defined by JIS C6823:2010_10 or a value that is measured by an extensible drum method that is one of abrasive paper methods is usable. The micro bending loss may be a value that is measured by a wire mesh method or still another measurement method (for example, an oblique winding method).

In an optical fiber, when the outer diameter of a portion made of glass, for example, the cladding diameter is reduced, a leakage loss resulting from leakage of light transmitting through the optical fiber out of the portion made of glass may occur. Thus, it is preferable that the leakage loss of the optical fiber 1 according to the embodiment at a wavelength of 1625 nm be 0.001 dB/km or smaller.

The optical fiber according to the embodiment will be described below with reference to the results of simulation calculations.

First of all, with regard to optical fibers having the step-type, W-type and trench-type refractive index profiles illustrated in FIG. 2, structural parameters of Δ1, Δ2, Δ3, 2a, 2b and 2c were exhaustively changed into various values and combined and bending losses at the wavelength of 1550 nm in the case of bending at a diameter of 20 mm were calculated. From these results, the relationship between Δ1 and the bending loss was researched. Part of the research is illustrated in FIG. 3.

Figure 3:
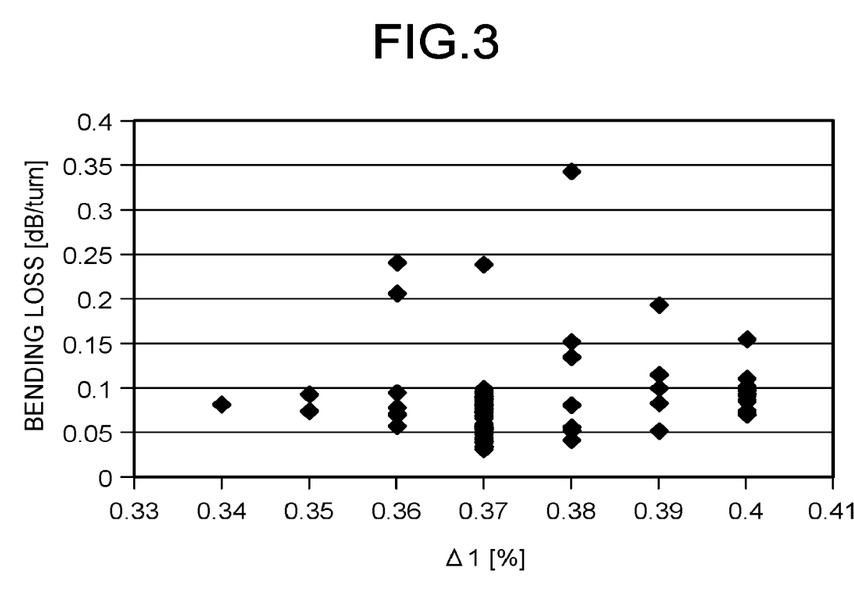
FIG. 3 is a diagram illustrating an example of a relationship between Δ1 and a bending loss.

As part of the research is illustrated also in FIG. 3, with regard to all the refractive index profiles, it was confirmed that there are many cases in which, when Δ1 is between 0.33% and 0.40% inclusive, the bending loss may be 0.75 dB/turn or smaller and furthermore may be 0.10 dB/turn or smaller.

According to the search, it was confirmed that employing the trench-type refractive index profile tends to reduce the bending loss. The smaller Δ1 is, the more the amount of use of Ge that is a dopant to increase the refractive index on manufacturing of optical fibers is reducible, which reduces the manufacturing cost and enables easy manufacturing. Furthermore, the smaller the absolute value of Δ2 in the W-type or the absolute value of Δ3 in the trench-type is, the more the amount of use of a dopant that reduces the refractive index is reducible, which reduces the manufacturing cost and enables easy manufacturing.

Subsequently, in the above-described research, a structure parameter combination in the case where the bending loss may be 0.75 dB/turn or smaller and Δ1 is between 0.33% and 0.40% inclusive was selected. With regard to the selected combination, the thickness of the primary coating layer of the coating (referred to as primary thickness below as appropriate) was set at 20 μm and the thickness of the secondary coating layer (a secondary thickness) was set at 15 μm and then a standardized micro bending loss with respect to the standard SMF was calculated. At the calculation, the cladding diameter (fiber diameter) was set at 80 μm, 90 μm, 100 μm, 110 μm or 120 μm. From these results, the relationship between Δ1 and the micro bending loss was researched. Part of the research is illustrated in FIG. 4.

Figure 4:
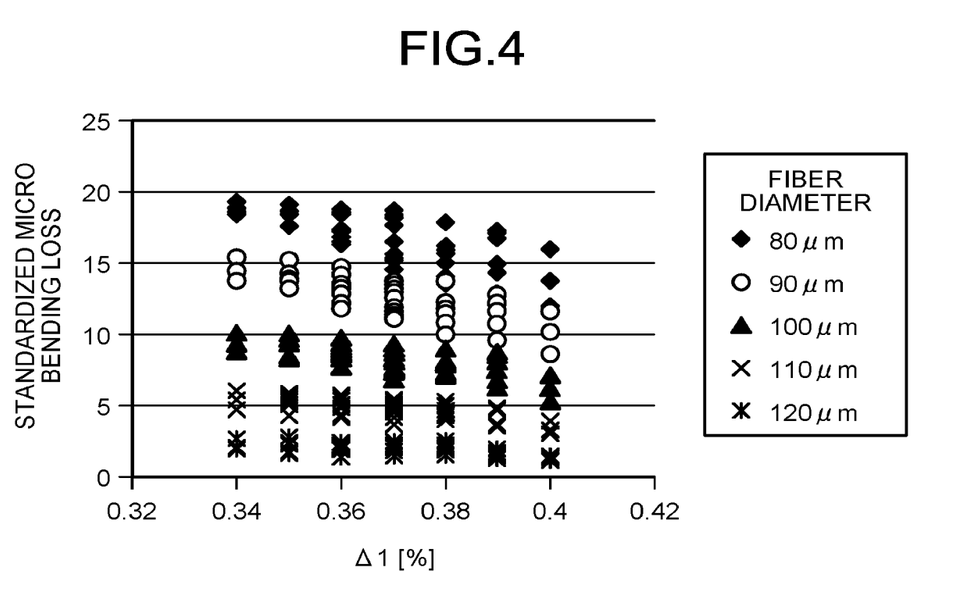
FIG. 4 is a diagram illustrating an example of a relationship between Δ1 and a standardized micro bending loss.

As part of the research is illustrated in FIG. 4, it was confirmed that there is a close relationship between the fiber diameter and the standardized micro bending loss. As for all the refractive index profiles or all the cladding diameters, it was confirmed that there are many cases where, when Δ1 is between 0.33% and 0.40% inclusive, the standardized micro bending loss may be 20 or smaller. In the cases where the fiber diameters were 100 μm, 110 μm and 120 μm, it was confirmed that there are many cases where the standardized micro bending loss may be 10 or smaller. The condition that the thickness of the primary coating layer is 20 μm is a relatively strict condition in order to reduce the micro bending loss. Even under the condition, however, it was confirmed that, with a small fiber diameter of 120 μm or smaller, it is possible to inhibit an increase not only in the micro bending loss according to the G.657Δ1 standard or the G.657Δ2 standard but also in the standardized micro bending loss at 20 or smaller or approximately 10 or smaller.

In the above-described calculation, a minimum fiber diameter (limit fiber diameter) necessary to obtain a leakage loss of 0.001 dB/km at the wavelength of 1625 nm was calculated. In the combinations on which calculations were made, all the limit fiber diameters were 100 μm or smaller and were 80 μm or smaller in many combinations. In other words, it was confirmed that, also with a small fiber diameter of 120 μm or smaller or a further smaller diameter to approximately 80 μm, an excessive leakage loss does not occur.

The outer diameter of the optical fiber including the coating may be set at 210 μm or smaller by setting the primary thickness at 25 μm or smaller and setting the secondary thickness at 20 μm or smaller when the cladding diameter is set at 120 μm or smaller. In order to further reduce the outer diameter of the optical fiber, it is preferable to further reduce the cladding diameter and reduce the primary thickness and the secondary thickness. For example, setting the cladding diameter at approximately 80 μm, setting the primary thickness at 25 μm or smaller, and setting the secondary thickness at 20 μm or smaller based on the above-described calculation make it possible to set the outer diameter of the optical fiber at 170 μm or smaller.

Figure 5:
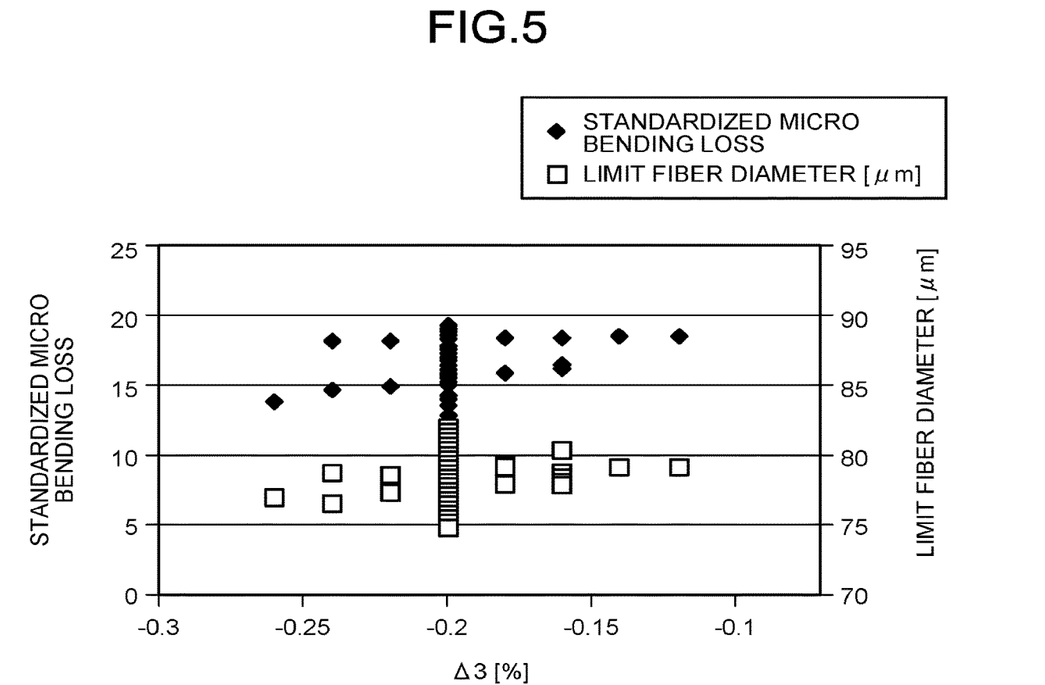
FIG. 5 is a diagram illustrating an example of a relationship between Δ3 and the standardized bending loss or a limit fiber diameter.

Subsequently, in the above-described research, combinations of structural parameters in the case of the trench-type refractive index profile from the step-type, W-type and trench-type refractive index profiles where Δ1 is between 0.33% and 0.40% inclusive were selected. For the selected combinations, the cladding diameter was set at 80 μm, the outer diameter of the primary coating layer (referred to as primary diameter as appropriate below) was set at 129 μm, and the outer diameter of the secondary coating layer (referred to as secondary diameter as appropriate below) was set at 167 μm and the relationship between Δ3 and the standardized micro bending loss or the limit fiber diameter was researched. FIG. 5 illustrates part of the research.

As part of the research is illustrated also in FIG. 5, both the standardized micro bending loss and the limit fiber diameter tended to decrease linearly as Δ3 decreases. From the fact, the decrease in Δ3 is effective in reducing the standardized micro bending loss and the limit fiber diameter. Obviously from FIG. 5, because, even with the same value of Δ3, the standardized micro bending loss and the limit fiber diameter differ according to the structural parameters to be combined, it is preferable to select a combination of structural parameters according to a required specification.

Tables 1 and 2 represent, as Calculation Examples 1 to 59, combinations of Δ1, Δ2, Δ3, b/a, c/a and 2a that are structural parameters of the trench type that were used for calculation and properties of optical fibers of the respective combinations. The unit of macro bending loss is presented in [dB/m]. [dB/m] and [dB/turn] are convertible as 0.1 dB/turn is approximately equivalent to 1.59 dB/m. As for the standardized micro bending losses, the fiber diameter was set at 80 μm, the primary diameter was set at 129 μm, and the secondary diameter was set at 167 μm and then standardized micro bending losses with respect to the standard SMD were calculated. At the calculation, the primary thickness was 24.5 μm and the secondary thickness was 19 μm.

As presented in Tables 1 and 2, in all Calculation Examples 1 to 59, the limit fiber diameter was 120 μm or smaller and furthermore was 82 μm or smaller and most of the limit fiber diameters are 80 μm or smaller, which, with the leakage loss kept at 0.001 dB/km or smaller, enabled the fiber diameters to be 120 μm or smaller and furthermore 82 μm or smaller and enabled most of the fiber diameters to be 80 μm or smaller. As for all Calculation Examples 1 to 59, the MFD at a wavelength of 1310 nm was between 8.6 μm and 9.2 μm inclusive, λcc was between 1000 nm and 1260 μm, and the standardized micro bending loss at the wavelength of 1550 nm was 20 or smaller. In all Calculation Examples 1 to 59, the micro bending loss at the wavelength of 1550 nm was 1.59 dB/m or smaller, that is, 0.1 dB/turn or smaller. All the optical fibers according to Calculation Examples 1 to 59 on Table 1 and Table 2 met properties that the zero-dispersion wavelength is between 1300 nm and 1324 nm inclusive and the dispersion slope at the zero-dispersion wavelength is 0.092 ps/nm$^2$/km or smaller.

Subsequently, a combination of W-type structural parameters of the above-described research was selected. Table 3 presents the selected combination of Δ1, Δ2, b/a and 2a that are W-type structural parameters and properties of the optical fiber of each combination. Note that the standardized micro bending loss was obtained in a way that the fiber diameter was set at 80 μm, the primary diameter was set at 135 μm, and the secondary diameter was set at 175 μm and then a standardized micro bending loss with respect to the standard SMF was calculated.

As Table 3 presents, in Calculation Example 60, the limit fiber diameter was 80 μm or smaller, which enabled the fiber diameter to be 80 μm or smaller with the leakage loss at 0.001 dB/km or smaller. Furthermore, the MFD at the wavelength 1310 nm was between 8.6 μm and 9.2 μm inclusive, λcc was between 1000 nm and 1260 μm inclusive, and the standardized micro bending loss at the wavelength of 1550 nm was 20 or smaller. The macro bending loss at the wavelength of 1550 nm was 1.59 dB/m or smaller, that is, 0.1 dB/turn or smaller. Note that the zero-dispersion wavelength was 1292 nm and the dispersion slope at the zero-dispersion wavelength was 0.092 ps/nm$^2$/km.

In other words, according to Calculation Examples 1 to 60, because it is possible to realize a MFD, λcc and a macro bending loss corresponding to the G.657Δ1 standard or the G.657Δ2 standard and a fiber diameter of 120 μm or smaller, it is possible to realize an optical fiber with a small diameter and a preferable bending property. As for the standardized micro bending loss, setting the fiber diameter, the primary diameter, and the secondary diameter at values larger than the above-described values easily makes it possible to further reduce the micro bending loss and keep the standardized micro bending loss at 10 or smaller.

TABLE 1

| Calculation example No. | Δ1 [%] | Δ2 [%] | Δ3 [%] | b/a | c/a | 2a [μm] | Limit fiber diameter @1625 nm [μm] | Standardized micro bending loss @1550 nm | Macro bending loss @1550 nm [dB/m] | MFD @1310 nm [μm] | λ cc [nm] |
|---|---|---|---|---|---|---|---|---|---|---|---|
| No. 1 | 0.39 | 0 | −0.2 | 3 | 4 | 8.2 | 77.2 | 17.18 | 1.31 | 8.68 | 1256 |
| No. 2 | 0.37 | 0 | −0.2 | 2.6 | 4 | 8.3 | 78.8 | 17.47 | 1.56 | 8.86 | 1248 |
| No. 3 | 0.37 | 0 | −0.2 | 2.4 | 4 | 8.3 | 78.0 | 16.74 | 1.15 | 8.84 | 1249 |
| No. 4 | 0.37 | 0 | −0.2 | 2.2 | 4 | 8.3 | 77.2 | 15.54 | 0.870 | 8.82 | 1255 |
| No. 5 | 0.37 | 0 | −0.2 | 2 | 4 | 8.0 | 79.8 | 11.50 | 1.29 | 8.64 | 1213 |
| No. 6 | 0.37 | 0 | −0.2 | 2 | 4 | 8.2 | 77.6 | 12.82 | 1.04 | 8.73 | 1243 |
| No. 7 | 0.37 | 0 | −0.2 | 3 | 4.6 | 8.0 | 80.2 | 18.25 | 1.42 | 8.73 | 1230 |
| No. 8 | 0.37 | 0 | −0.2 | 3 | 4.6 | 8.1 | 79.0 | 18.26 | 1.28 | 8.76 | 1247 |
| No. 9 | 0.37 | 0 | −0.2 | 3 | 4.8 | 8.0 | 78.6 | 18.25 | 0.943 | 8.71 | 1249 |
| No. 10 | 0.37 | 0 | −0.2 | 3 | 5 | 7.9 | 78.6 | 18.25 | 0.853 | 8.72 | 1253 |
| No. 11 | 0.37 | −0.05 | −0.2 | 3 | 4 | 8.7 | 77.6 | 15.12 | 1.52 | 8.71 | 1246 |
| No. 12 | 0.36 | 0 | −0.2 | 2.2 | 4 | 8.3 | 79.4 | 16.42 | 1.49 | 8.89 | 1242 |
| No. 13 | 0.36 | 0 | −0.2 | 2.2 | 4 | 8.4 | 78.4 | 16.65 | 1.12 | 8.94 | 1255 |
| No. 14 | 0.35 | 0 | −0.2 | 2.2 | 4 | 8.5 | 79.8 | 17.45 | 1.46 | 9.05 | 1255 |
| No. 15 | 0.38 | 0 | −0.2 | 2.2 | 4 | 8.2 | 76.0 | 13.99 | 0.821 | 8.71 | 1255 |
| No. 16 | 0.39 | 0 | −0.2 | 2.2 | 4 | 8.1 | 75.0 | 11.93 | 0.806 | 8.6 | 1255 |
| No. 17 | 0.37 | −0.02 | −0.2 | 2.2 | 4 | 8.3 | 78.0 | 13.48 | 0.943 | 8.69 | 1238 |
| No. 18 | 0.37 | −0.04 | −0.2 | 2.2 | 4 | 8.5 | 76.6 | 11.93 | 0.686 | 8.66 | 1251 |
| No. 19 | 0.37 | 0.02 | −0.2 | 2.2 | 4 | 8.2 | 77.2 | 16.69 | 1.24 | 8.92 | 1255 |
| No. 20 | 0.37 | 0.04 | −0.2 | 2.2 | 4 | 7.9 | 79.0 | 17.16 | 1.4 | 8.95 | 1246 |
| No. 21 | 0.37 | 0 | −0.18 | 2.2 | 4 | 8.3 | 78.0 | 15.84 | 1.13 | 8.82 | 1248 |

TABLE 1-continued

| Calculation example No. | Δ1 [%] | Δ2 [%] | Δ3 [%] | b/a | c/a | 2a [μm] | Limit fiber diameter @1625 nm [μm] | Standardized micro bending loss @1550 nm | Macro bending loss @1550 nm [dB/m] | MFD @1310 nm [μm] | λ cc [nm] |
|---|---|---|---|---|---|---|---|---|---|---|---|
| No. 22 | 0.37 | 0 | −0.16 | 2.2 | 4 | 8.3 | 78.8 | 16.18 | 1.57 | 8.83 | 1241 |
| No. 23 | 0.37 | 0 | −0.16 | 2.2 | 4 | 8.4 | 77.8 | 16.39 | 1.45 | 8.87 | 1256 |
| No. 24 | 0.37 | 0 | −0.22 | 2.2 | 4 | 8.2 | 77.4 | 14.87 | 0.901 | 8.77 | 1249 |
| No. 25 | 0.37 | 0 | −0.24 | 2.2 | 4 | 8.2 | 76.6 | 14.55 | 0.842 | 8.77 | 1256 |
| No. 26 | 0.37 | 0 | −0.26 | 2.2 | 4 | 8.1 | 77.0 | 13.72 | 0.806 | 8.72 | 1251 |
| No. 27 | 0.37 | 0 | −0.2 | 2.2 | 3.8 | 8.3 | 78.2 | 15.51 | 1.36 | 8.78 | 1241 |
| No. 28 | 0.37 | 0 | −0.2 | 2.2 | 3.8 | 8.4 | 77.4 | 15.82 | 1.08 | 8.82 | 1257 |
| No. 29 | 0.37 | 0 | −0.2 | 2.2 | 3.6 | 8.5 | 77.4 | 16.09 | 1.43 | 8.87 | 1256 |
| No. 30 | 0.37 | 0 | −0.2 | 2.2 | 4.2 | 8.2 | 77.0 | 15.25 | 0.743 | 8.74 | 1256 |

TABLE 2

| Calculation example No. | Δ1 [%] | Δ2 [%] | Δ3 [%] | b/a | c/a | 2a [μm] | Limit fiber diameter @1625 nm [μm] | Standardized micro bending loss @1550 nm | Macro bending loss @1550 nm [dB/m] | MFD @1310 nm [μm] | λ cc [nm] |
|---|---|---|---|---|---|---|---|---|---|---|---|
| No. 31 | 0.37 | 0 | −0.2 | 2.2 | 4.4 | 8.1 | 76.8 | 14.93 | 0.641 | 8.71 | 1246 |
| No. 32 | 0.37 | 0 | −0.2 | 2.2 | 4.6 | 7.9 | 77.6 | 14.21 | 0.505 | 8.62 | 1250 |
| No. 33 | 0.36 | 0 | −0.2 | 3 | 5 | 7.9 | 80.8 | 18.63 | 1.1 | 8.8 | 1235 |
| No. 34 | 0.36 | 0 | −0.2 | 3 | 5 | 8.0 | 79.6 | 18.63 | 0.916 | 8.84 | 1251 |
| No. 35 | 0.35 | 0 | −0.2 | 3 | 5 | 8.1 | 80.8 | 18.94 | 1.18 | 8.96 | 1249 |
| No. 36 | 0.34 | 0 | −0.2 | 3 | 5 | 8.2 | 82.0 | 19.18 | 1.29 | 9.09 | 1259 |
| No. 37 | 0.38 | 0 | −0.2 | 3 | 5 | 7.8 | 77.2 | 17.76 | 0.653 | 8.61 | 1254 |
| No. 38 | 0.37 | −0.02 | −0.2 | 3 | 5 | 8.0 | 77.8 | 17.27 | 0.521 | 8.61 | 1251 |
| No. 39 | 0.37 | 0 | −0.18 | 3 | 5 | 7.9 | 79.4 | 18.32 | 1.29 | 8.72 | 1240 |
| No. 40 | 0.37 | 0 | −0.18 | 3 | 5 | 8.0 | 78.2 | 18.33 | 1.07 | 8.76 | 1256 |
| No. 41 | 0.37 | 0 | −0.16 | 3 | 5 | 7.9 | 80.4 | 18.41 | 1.45 | 8.73 | 1228 |
| No. 42 | 0.37 | 0 | −0.16 | 3 | 5 | 8.1 | 78.2 | 18.40 | 1.16 | 8.8 | 1259 |
| No. 43 | 0.37 | 0 | −0.14 | 3 | 5 | 8.1 | 79.2 | 18.48 | 1.37 | 8.8 | 1246 |
| No. 44 | 0.37 | 0 | −0.12 | 3 | 5 | 8.2 | 79.0 | 18.56 | 1.49 | 8.84 | 1250 |
| No. 45 | 0.37 | 0 | −0.22 | 3 | 5 | 7.8 | 78.6 | 18.17 | 0.621 | 8.69 | 1250 |
| No. 46 | 0.37 | 0 | −0.24 | 3 | 5 | 7.7 | 78.8 | 18.09 | 0.528 | 8.65 | 1247 |
| No. 47 | 0.37 | 0 | −0.2 | 2.8 | 5 | 7.8 | 78.4 | 17.78 | 0.675 | 8.68 | 1249 |
| No. 48 | 0.37 | 0 | −0.2 | 2.6 | 5 | 7.7 | 78.8 | 16.99 | 0.606 | 8.63 | 1245 |
| No. 49 | 0.37 | 0 | −0.2 | 2.4 | 5 | 7.7 | 78.0 | 15.72 | 0.491 | 8.61 | 1254 |
| No. 50 | 0.37 | 0 | −0.2 | 2.2 | 5 | 7.9 | 74.8 | 18.44 | 1.20 | 8.73 | 1240 |
| No. 51 | 0.37 | 0 | −0.2 | 3.2 | 5 | 8.0 | 78.2 | 18.55 | 0.91 | 8.76 | 1256 |
| No. 52 | 0.37 | 0 | −0.2 | 3.2 | 5 | 7.9 | 79.4 | 18.56 | 1.57 | 8.73 | 1228 |
| No. 53 | 0.37 | 0 | −0.2 | 3.4 | 5 | 8.1 | 78.4 | 18.75 | 1.08 | 8.80 | 1259 |
| No. 54 | 0.37 | 0 | −0.2 | 1.9 | 3.9 | 8.3 | 76.8 | 11.83 | 1.01 | 8.73 | 1250 |
| No. 55 | 0.37 | 0 | −0.2 | 2.1 | 4.3 | 8.1 | 77.0 | 13.77 | 0.697 | 8.68 | 1249 |
| No. 56 | 0.37 | 0 | −0.2 | 2 | 4.2 | 8.1 | 77.2 | 12.25 | 0.819 | 8.65 | 1243 |
| No. 57 | 0.37 | 0 | −0.2 | 2 | 4.2 | 8.2 | 76.2 | 12.88 | 0.552 | 8.69 | 1259 |
| No. 58 | 0.37 | 0 | −0.2 | 1.9 | 4.1 | 8.1 | 77.8 | 10.39 | 0.830 | 8.60 | 1234 |
| No. 59 | 0.37 | 0 | −0.2 | 1.9 | 4.1 | 8.2 | 76.6 | 11.14 | 0.503 | 8.65 | 1250 |

TABLE 3

| Calculation example No. | Δ1 [%] | Δ2 [%] | b/a | 2a [μm] | Limit fiber diameter @1625 nm [μm] | Standardized micro bending loss @1550 nm | Macro bending loss @1550 nm [dB/m] | MFD @1310 nm [μm] | λ cc [nm] |
|---|---|---|---|---|---|---|---|---|---|
| No. 60 | 0.37 | −0.1 | 4.0 | 9.1 | 76.4 | 19.76 | 0.907 | 8.65 | 1253 |

The above-described embodiment exemplifies the step-type, W-type and trench-type as refractive index profiles, and other refractive index profiles, such as a segment core type and a side core type, are usable.

The optical fiber according to the disclosure is preferably usable for signal transmission.

According to the disclosure, an effect that an optical fiber that is suitable for a small diameter and that has a preferable bending property may be realized is made.

The above-described embodiment does not limit the disclosure. The disclosure covers ones configured by combining the above-described components as appropriate. Furthermore, further effects and modifications may be easily led by those skilled in the art. Thus, modes of the disclosure in a wider range are not limited to the above-described embodiment and various changes may be made.

What is claimed is:

1. An optical fiber comprising:
   a core made of silica-based glass;
   a cladding configured to cover an outer circumference of the core and made of silica-based glass having a refractive index smaller than a maximum refractive index of the core; and
   a coating configured to cover an outer circumference of the cladding, the coating being made of UV curing resin, wherein:
   the cladding to be covered by the coating has an outer diameter of 120 μm or smaller,
   a mode field diameter at a wavelength of 1310 nm is 8.6 μm to 9.2 μm,
   an effective cut-off wavelength is 1260 μm or smaller,
   a bending loss at a wavelength of 1550 nm in a case of bending at a diameter of 20 mm is 0.75 dB/turn or smaller,
   the core has a relative refractive index difference Δ1 of 0.37% to 0.4%, and
   the optical fiber including the coating that is made of the UV curing resin has an outer diameter of 210 μm or smaller.

2. The optical fiber according to claim 1, wherein the bending loss is 0.10 dB/turn or smaller.

3. The optical fiber according to claim 1, wherein a zero-dispersion wavelength is 1300 nm to 1324 nm and a dispersion slope at the zero-dispersion wavelength is 0.092 ps/nm²/km or smaller.

4. The optical fiber according to claim 1, wherein a micro bending loss at a wavelength of 1550 nm is 20 times as large as a micro bending loss of a standard optical fiber at the wavelength of 1550 nm or smaller, the standard optical fiber having properties that accord with a standard defined by ITU-T G.652 and including a resin coating having a thickness of 62.5 μm on an outer circumference of the cladding.

5. The optical fiber according to claim 4, wherein the micro bending loss is a value that is measured by an abrasive paper method or a wire mesh method.

6. The optical fiber according to claim 1, wherein an effective cutoff wavelength is set between 1000 nm and 1260 nm inclusive.

7. The optical fiber according to claim 1, wherein the coating includes
   a primary coating layer positioned on a side of the cladding, and
   a secondary coating layer positioned on a side of an outer circumference of the primary coating layer, and
   the primary coating layer has a thickness of 20 μm or larger.

8. An optical fiber comprising:
   a core made of silica-based glass;
   a cladding configured to cover an outer circumference of the core and made of silica-based glass having a refractive index smaller than a maximum refractive index of the core; and
   a coating configured to cover an outer circumference of the cladding, wherein:
   the cladding to be covered by the coating has an outer diameter of 120 μm or smaller,
   a mode field diameter at a wavelength of 1310 nm is 8.6 μm to 9.2 μm,
   an effective cut-off wavelength is 1260 μm or smaller,
   a bending loss at a wavelength of 1550 nm in a case of bending at a diameter of 20 mm is 0.75 dB/turn or smaller,
   the core has a relative refractive index difference Δ1 of 0.37% to 0.4%, the core includes:
     a center core,
     an intermediate layer formed on an outer circumference of the center core, and
     a trench layer formed on an outer circumference of the intermediate layer, and
   in a case where a core diameter of the center core is 2a, an inner diameter of the trench layer is 2b and an outer diameter of the trench layer is 2c, b/a is 1.8 to 3.6 and c/a is 3.4 to 5.2.

9. The optical fiber according to claim 8, wherein, in a case where a relative refractive-index difference of the trench layer with respect to the cladding is Δ3, Δ3 is −0.26% to −0.10%.

10. The optical fiber according to claim 8, wherein, in a case where a relative refractive-index difference of the intermediate layer with respect to the cladding is Δ2, Δ2 is −0.05% to 0.04% 0.04%.

11. The optical fiber according to claim 8, wherein the optical fiber including the coating has an outer diameter of 210 μm or smaller.

12. The optical fiber according to claim 8, wherein the bending loss is 0.10 dB/turn or smaller.

13. The optical fiber according to claim 8, wherein a zero-dispersion wavelength is 1300 nm to 1324 nm and a dispersion slope at the zero-dispersion wavelength is 0.092 ps/nm²/km or smaller.

14. The optical fiber according to claim 8, wherein a micro bending loss at a wavelength of 1550 nm is 20 times as large as a micro bending loss of a standard optical fiber at the wavelength of 1550 nm or smaller, the standard optical fiber having properties that accord with a standard defined by ITU-T G.652 and including a resin coating having a thickness of 62.5 μm on an outer circumference of the cladding.

15. The optical fiber according to claim 14, wherein the micro bending loss is a value that is measured by an abrasive paper method or a wire mesh method.

16. The optical fiber according to claim 8, wherein an effective cutoff wavelength is set between 1000 nm and 1260 nm inclusive.

17. The optical fiber according to claim 8, wherein the coating includes
   a primary coating layer positioned on a side of the cladding, and
   a secondary coating layer positioned on a side of an outer circumference of the primary coating layer, and
   the primary coating layer has a thickness of 20 μm or larger.

18. An optical fiber comprising:
   a core made of silica-based glass;
   a cladding configured to cover an outer circumference of the core and made of silica-based glass having a refractive index smaller than a maximum refractive index of the core; and
   a coating configured to cover an outer circumference of the cladding, wherein
   the cladding to be covered by the coating has an outer diameter of 120 μm or smaller,
   a mode field diameter at a wavelength of 1310 nm is 8.6 μm to 9.2 μm,
   an effective cut-off wavelength is 1260 μm or smaller, a bending loss at a wavelength of 1550 nm in a case of bending at a diameter of 20 mm is 0.75 dB/turn or smaller, the core has a relative refractive index difference Δ1 of 0.37% to 0.4%, the core includes
- a center core, and
- a depressed layer formed on an outer circumference of the center core, the core has a W-type refractive index profile, in a case where a relative refractive-index difference of the depressed layer with respect to the cladding is Δ2, Δ2 is −0.20% to −0.01%, and in a case where a core diameter of the center core is 2a and an outer diameter of the depressed layer is 2b, b/a is 1.5 to 6.

19. The optical fiber according to claim 18, wherein the bending loss is 0.10 dB/turn or smaller.

20. The optical fiber according to claim 18, wherein a zero-dispersion wavelength is 1300 nm to 1324 nm and a dispersion slope at the zero-dispersion wavelength is 0.092 ps/nm$^2$/km or smaller.

21. The optical fiber according to claim 18, wherein a micro bending loss at a wavelength of 1550 nm is 20 times as large as a micro bending loss of a standard optical fiber at the wavelength of 1550 nm or smaller, the standard optical fiber having properties that accord with a standard defined by ITU-T G.652 and including a resin coating having a thickness of 62.5 μm on an outer circumference of the cladding.

22. The optical fiber according to claim 21, wherein the micro bending loss is a value that is measured by an abrasive paper method or a wire mesh method.

23. The optical fiber according to claim 18, wherein an effective cutoff wavelength is set between 1000 nm and 1260 nm inclusive.

24. The optical fiber according to claim 18, wherein the optical fiber including the coating has an outer diameter of 210 μm or smaller.

25. The optical fiber according to claim 18, wherein the coating includes
- a primary coating layer positioned on a side of the cladding, and
- a secondary coating layer positioned on a side of an outer circumference of the primary coating layer, and
- the primary coating layer has a thickness of 20 μm or larger.

* * * * *